US009801331B2

(12) United States Patent
Foster et al.

(10) Patent No.: US 9,801,331 B2
(45) Date of Patent: Oct. 31, 2017

(54) INTERACTIVE GAUGE CONTROL SYSTEM AND METHOD FOR AGRICULTURAL SYSTEMS

(71) Applicants: CNH Industrial America LLC, New Holland, PA (US); Autonomous Solutions, Inc., Mendon, UT (US)

(72) Inventors: Christopher A. Foster, Mohnton, PA (US); John H. Posselius, Ephrata, PA (US); Brandon Chamberlain Adams, Wellsville, UT (US); James Brian Stewart, Richmond, UT (US); Paul J. Lewis, Hyrum, UT (US); Bret Todd Turpin, Wellsville, UT (US); Joshua Hill Henrie, Hyrum, UT (US); Max J. Barfuss, Logan, UT (US); Jeremy Alexander Harris, Preston, ID (US)

(73) Assignees: CNH Industrial America LLC, New Holland, PA (US); Autonomous Solutions, Inc., Mendon, UT (US)

( * ) Notice: Subject to any disclaimer, the term of this patent is extended or adjusted under 35 U.S.C. 154(b) by 0 days.

(21) Appl. No.: 14/709,196

(22) Filed: May 11, 2015

(65) Prior Publication Data

US 2015/0325065 A1 Nov. 12, 2015

Related U.S. Application Data

(60) Provisional application No. 61/991,562, filed on May 11, 2014.

(51) Int. Cl.
*A01C 7/20* (2006.01)
*G07C 5/08* (2006.01)
(Continued)

(52) U.S. Cl.
CPC .............. *A01C 7/203* (2013.01); *A01B 63/32* (2013.01); *A01B 76/00* (2013.01); *G07C 5/08* (2013.01);
(Continued)

(58) Field of Classification Search
CPC .. G07C 5/0825; G07C 5/0808; G07C 5/0841; A01B 76/00
(Continued)

(56) References Cited

U.S. PATENT DOCUMENTS

2002/0026279 A1* 2/2002 Kato ...................... G01C 21/36
701/538
2003/0020600 A1* 1/2003 Koenig ............... B60R 16/0373
340/407.1

(Continued)

*Primary Examiner* — Rodney Butler
*Assistant Examiner* — Frederick Brushaber
(74) *Attorney, Agent, or Firm* — Rebecca L. Henkel; Rickard K. DeMille

(57) ABSTRACT

A system includes an electronic control system for an agricultural system including a controller. The controller is configured to instruct a display of a user interface to present a gauge having a first indication of a current state of operation of a controllable device of the agricultural system. Moreover, the controller is configured to receive an input indicative of a desired state of operation of the controllable device. Furthermore, the controller is configured to output a signal to the controllable device indicative of the desired state of operation, and to instruct the display to present a second indication on the gauge indicative of the desired state of operation.

20 Claims, 7 Drawing Sheets

(51) Int. Cl.
    *A01B 76/00*     (2006.01)
    *A01B 63/32*     (2006.01)
    *A01B 79/00*     (2006.01)

(52) U.S. Cl.
    CPC ......... *G07C 5/0808* (2013.01); *G07C 5/0825* (2013.01); *G07C 5/0841* (2013.01); *A01B 79/005* (2013.01)

(58) Field of Classification Search
    USPC .......................................................... 701/50
    See application file for complete search history.

(56) References Cited

U.S. PATENT DOCUMENTS

| | | | |
|---|---|---|---|
| 2004/0176906 A1* | 9/2004 | Matsubara | G01C 21/3608 701/432 |
| 2009/0063598 A1* | 3/2009 | Player | G06Q 10/10 708/201 |
| 2011/0074825 A1* | 3/2011 | Nishihashi | G06T 1/00 345/660 |
| 2012/0179319 A1* | 7/2012 | Gilman | B60W 50/0097 701/22 |
| 2012/0179395 A1* | 7/2012 | Gilman | B60L 11/1861 702/61 |

\* cited by examiner

INTERACTIVE GAUGE CONTROL SYSTEM AND METHOD FOR AGRICULTURAL SYSTEMS

BACKGROUND

The invention relates generally to agricultural systems and, more particularly, to interactive gauges for monitoring and controlling agricultural systems.

Generally, operators monitor and control agricultural systems using manual controls (e.g., levers, knobs, switches, etc.) and/or displays (e.g., gauges, alphanumeric displays, graphical displays, etc.). For example, an operator may monitor a needle gauge during operation to verify that hydraulic fluid pressure is within a target range. Alternatively, a graphic display may present several measurements to an operator, including fluid pressures, fuel levels, and positions of various pieces of agricultural equipment. As a result, operators may monitor a variety of tillage, planting, and/or fertilizing operations from the cab of a work vehicle or offsite control station.

BRIEF DESCRIPTION

In one embodiment, an electronic control system for an agricultural system includes a controller. In some embodiments, the controller is configured to instruct a display of a user interface to present a gauge having a first indication of a current state of operation of a controllable device of the agricultural system. Moreover, the controller is configured to receive an input indicative of a desired state of operation of the controllable device. Furthermore, the controller is configured to output a signal to the controllable device indicative of the desired state of operation, and to instruct the display to present a second indication on the gauge indicative of the desired state of operation.

In another embodiment, an electronic control system for an agricultural system includes a controller. The controller includes a memory operatively coupled to a processor configured to store data and instructions that, when executed by the processor, cause the controller to perform a method. The method performed by the controller includes presenting a first indicator on a gauge on a display of a user interface indicative of a first state of operation of a controllable device of the agricultural system. The method further includes receiving an input indicative of a second state of operation of the controllable device. The method also includes outputting a signal to the controllable device indicative of the second state of operation. In some embodiments, the controllable device is configured to adjust an operating parameter of the agricultural system. The method further includes presenting a second indicator on the gauge indicative of the second state of operation of the controllable device.

In a further embodiment, a method of monitoring and controlling an agricultural system includes presenting a first indicator on a gauge on a display of a user interface indicative of a first state of operation of a controllable device of the agricultural system. The method further includes receiving an input indicative of a second state of operation of the controllable device. The method also includes outputting a signal to the controllable device indicative of the second state of operation. In some embodiments, the controllable device is configured to adjust an operating parameter of the agricultural system. The method includes presenting a second indicator on the gauge indicative of the second state of operation of the controllable device.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The embodiments described herein relate to an interactive gauge with a state indicator. The interactive gauge is part of a user interface that is configured to enable an operator to adjust operating parameters of an agricultural vehicle and/or a work vehicle through interaction with the gauge. For example, the operator may touch and slide the indicator to manually change an operating parameter of the agricultural equipment and show automatic changes to the operating parameters of the agricultural equipment. Moreover, in certain embodiments, the indicator is configured to change colors and/or shapes to provide a visual indication to the operator regarding the operating mode (e.g., manual or automatic) and the operating parameters of the implement and/or work vehicle. Furthermore, the interactive gauge provides real time feedback to the operator about current operating parameters. The user interface with the interactive gauges enables operators to efficiently monitor operating conditions and make adjustments based on anticipated conditions.

Figure 1:
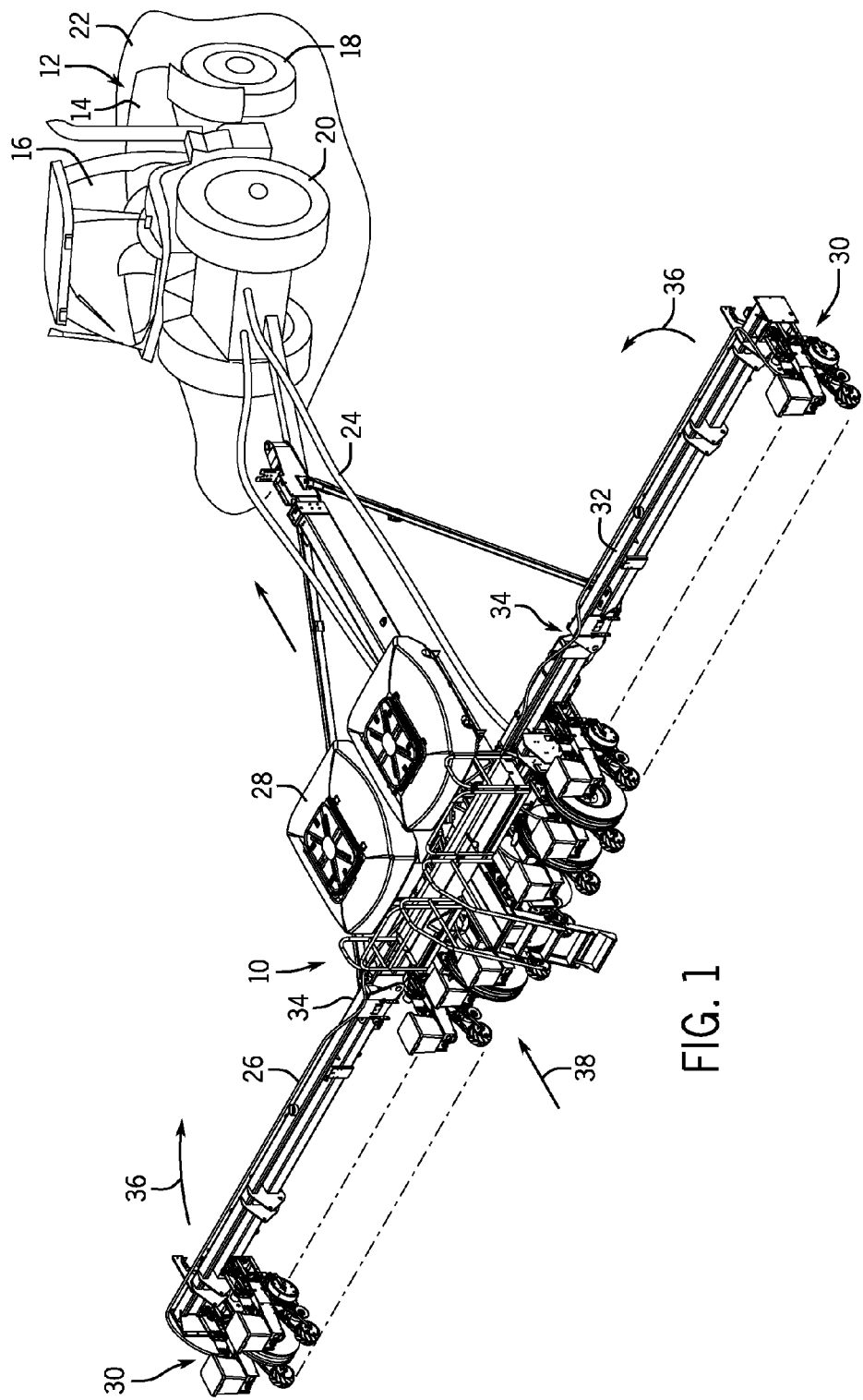
FIG. 1 is a perspective view of an embodiment of an agricultural implement and a work vehicle having a control system.

Turning now to the drawings, FIG. 1 is a perspective view of an embodiment of an agricultural implement 10 and a work vehicle 12. The illustrated work vehicle 12 has a body 14 that houses an engine, transmission (e.g., gear box), cooling system, and power train. The work vehicle 12 has a cabin 16 where an operator may sit or stand to operate the vehicle 12. The work vehicle 12 has two front wheels 18 and two rear wheels 20 that rotate to move the work vehicle 12 along the ground 22 at a ground speed. In some embodiments, the work vehicle 12 may have tracks rather than one or both sets of wheels 18, 20.

The agricultural implement 10 is towed behind the work vehicle 12 across the ground 22, as shown in FIG. 1. However, in certain embodiments, the agricultural implement 10 may be a self-contained self-propelled machine (e.g., a self-propelled sprayer, a combine harvester, a forage harvester, etc.). While the illustrated embodiment shows a planter, it shall be appreciated that the agricultural implement 10 may be a field cultivator, sprayer, or any other type of agricultural implement towed behind the work vehicle 12. The work vehicle 12 supplies a working fluid (e.g., hydraulic fluid) to the agricultural implement via one or more fluid lines 24. One or more actuators (e.g., hydraulic motors, hydraulic cylinders, etc.) receive the working fluid from the work vehicle 12 and drive systems of the agricultural implement 10. For example, one or more hydraulic motors may drive a fan and/or seed drive to direct agricultural material (e.g., seeds, fertilizer, etc.) along supply lines 26 from tanks 28 to multiple row units 30 distributed along a frame assembly 32. Each row unit 30 may be configured to deposit seeds at a desired depth beneath the soil surface, thereby establishing rows of planted seeds.

The agricultural implement 10 may have a variety of systems driven by the working fluid (e.g., hydraulic fluid) supplied by the work vehicle 12. For example, motors of the agricultural implement may be driven by the working fluid to facilitate delivery of the agricultural product and/or may establish a vacuum pressure within the tanks 28 or supply lines. In some embodiments, the frame assembly 32 of the agricultural implement 10 may be adjustable to fold into a transport configuration (e.g., via rotation of wings about joints 34) as shown by arrows 36 and/or to pivot and align the frame assembly 32 with a direction of travel 38. In some embodiments, the folding is accomplished via actuators.

Figure 2:
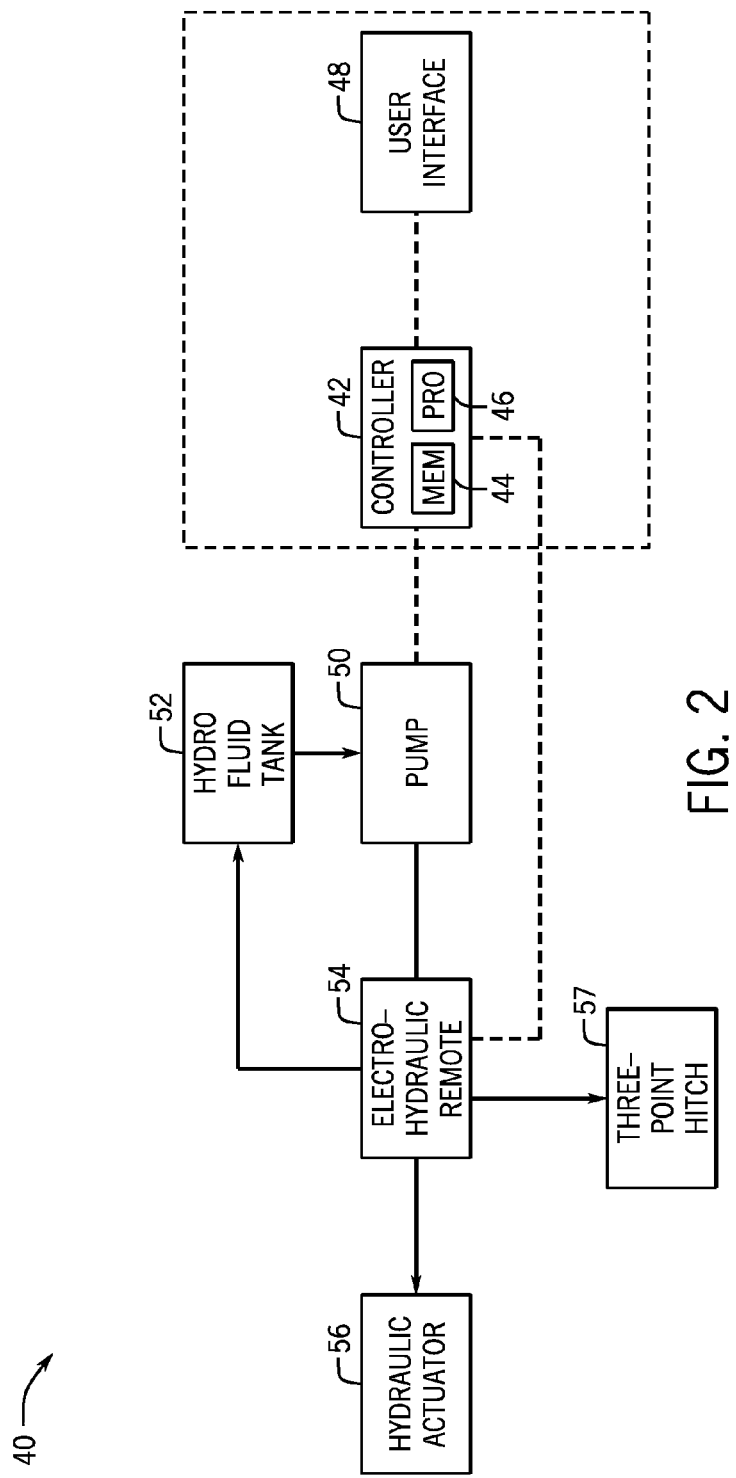
FIG. 2 is a block diagram of an embodiment of a control system configured to control an agricultural implement and for a work vehicle.

FIG. 2 is a block diagram of an embodiment of a control system 40 for controlling hydraulic fluid pressure and/or flow to actuators within the agricultural implement 10. In the illustrated embodiment, the control system 40 includes a controller 42 having a memory 44 and a processor 46, and a user interface 48. The memory 44 may be any type of non-transitory machine readable medium for storing data and executable instructions, such as random-access memory, read-only memory, rewritable flash memory, hard drives, optical discs, and the like. The processor 46 may execute instructions stored on the memory 44. For example, the memory 44 may contain machine readable code, such as instructions, that may be executed by the processor 46. In some embodiments, the memory 44 and processor 46 may enable automatic (e.g., processor/memory controlled) operation of the agricultural implement 10 and/or the work vehicle 12 (e.g., via control of certain actuators).

As will be described in detail below, the user interface 48 is configured to display real time information (e.g., hydraulic fluid pressure and/or flow, work vehicle 12 speed, etc.) to the operator in the cabin 16. However, in certain embodiments, the user interface 48 may be in a remote operator station. Moreover, the user interface 48 may enable an operator to input commands to the controller 42 to modify operation of the agricultural implement 10 and/or the work vehicle 12. For example, the operator may change hydraulic fluid pressure and/or flow in the fluid lines 24 based on anticipated terrain conditions. Furthermore, in certain embodiments, the user interface 48 is a "touch screen" or interactive type of display (e.g., liquid crystal display, light emitting diode display, etc.) that is configured to receive inputs from the operator. For example, in some embodiments, the user interface 48 is a capacitive touch screen with haptic feedback. However, other types of technology may be used to receive operator input, including infrared, resistive, piezoelectric, and the like.

In the illustrated embodiment, the control system 40 also includes a pump 50, a hydraulic fluid tank 52, an electro-hydraulic remote valve valve 54 (e.g., a controllable device), a hydraulic actuator 56, and a three-point hitch 57. The pump 50 is configured to flow hydraulic fluid from the hydraulic fluid tank 52 to the electro-hydraulic remote valve 54. For example, the pump 50 may receive a signal from the controller 42 indicating a desired hydraulic fluid pressure. As a result, the pump 50 may adjust the pressure of hydraulic fluid directed to the electro-hydraulic remote valve 54. Accordingly, the electro-hydraulic remote valve 54 may direct valve(s) to adjust the open/close ratio to control hydraulic fluid flow to the hydraulic actuator 56 and/or the three-point hitch 57 to facilitate movement and/or operation of one or more components of the agricultural implement 10 and/or the work vehicle 12. It should be appreciated that while the control system 40 is directed toward controlling hydraulic fluid pressure, in alternative embodiments, other systems of the agricultural implement 10 and/or the work vehicle 12 may be monitored and/or controlled by the control system 40. For example, various parameters of the work vehicle 12, such as engine speed, torque, ground speed, and the like may be controlled by the control system 40. Moreover, the control system 40 may monitor and/or control various parameters of the agricultural implement 10, such as fertilizer levels, deployment of ground engaging equipment, and the like. Furthermore, in the illustrated embodiment, while one electro-hydraulic remote valve 54 is communicatively coupled to the controller 42, in other embodiments, any suitable number of electro-hydraulic remote valves 54 may be included in the control system 40, each configured to control flow to one or more respective actuators. Moreover, in alternative embodiments, the actuator 56 and/or the three-point hitch 57 may be controlled by a pneumatic system, an electrical system, or the like.

Figure 3:
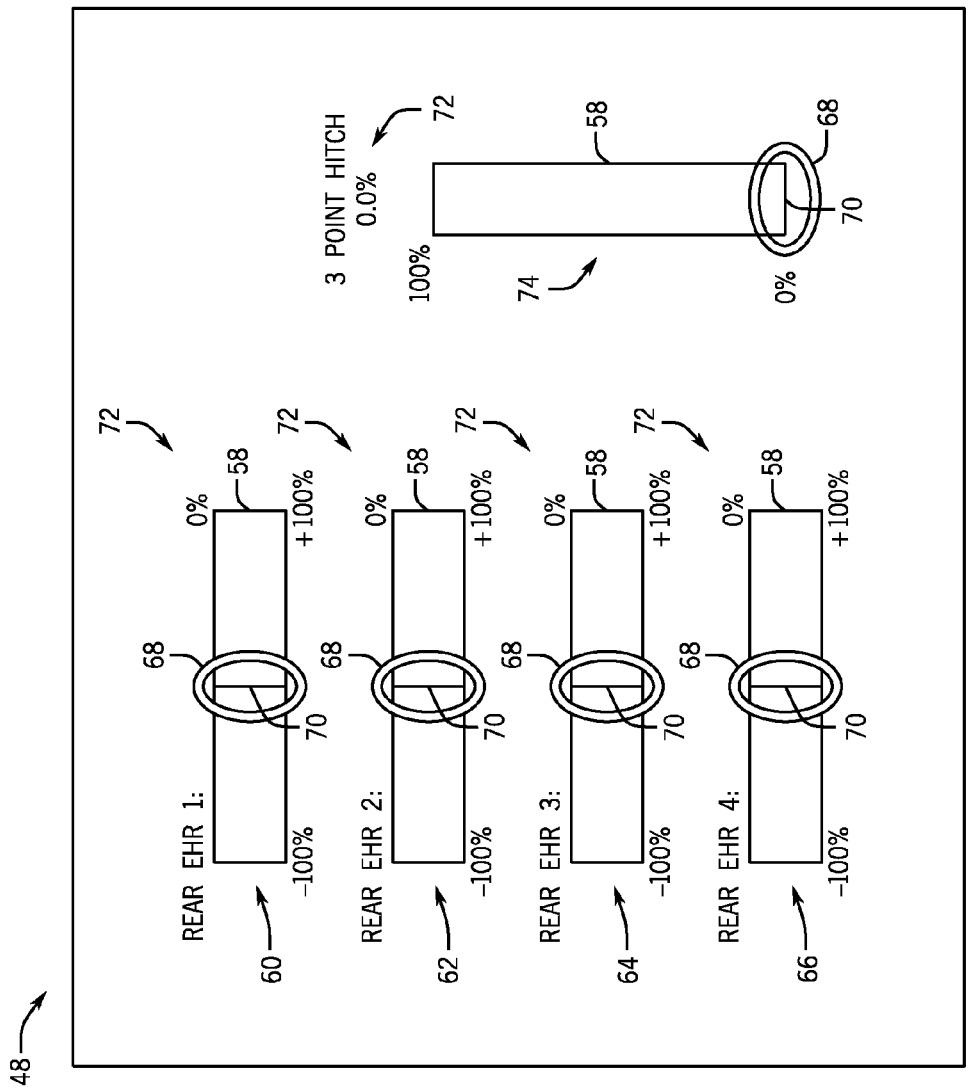
FIG. 3 is a schematic drawing of an embodiment of a user interface configured to monitor and/or control the control system of FIG. 2, in which the control system is in a non-operation mode.

FIG. 3 is a schematic diagram of an embodiment of the user interface 48. In the illustrated embodiment, the user interface 48 includes interactive gauges 58 (e.g., gauges, sliders, etc.) configured to display data related to the flow of hydraulic fluid through the electro-hydraulic remote valves 54 (e.g., one gauge 58 per remote 54). For example, in the illustrated embodiment, the gauges 58 include a range of −100 percent to +100 percent, indicating full flow out of the electro-hydraulic remote valves 54 to the tank 52 (e.g., −100 percent) or full flow into the electro-hydraulic remote valves from the pump 50 (e.g., +100 percent). However, in alternative embodiments, the gauges 58 may relay different information. For example, the gauges 58 may show the position of valves (e.g., open, closed, partially closed, float), the pressure in the fluid lines 24, and/or the like. It should be appreciated that the gauge 58 may contain markings along the length of the gauge 58 indicating the position of the valve (e.g., −25%, +25%, etc.)

As shown, each gauge 58 is labeled to indicate a different electro-hydraulic remote valve 54. While the illustrated embodiment shows four gauges 60, 62, 64, 66 as electro-hydraulic remote valves 54, it should be appreciated that any number of electro-hydraulic remote valves 54, position indicators, or the like may be represented on the user interface 48 by the gauges 58. Moreover, in alternative embodiments, some gauges 58 may correspond to electro-hydraulic remote valves 54 while other gauges 58 correspond to engine oil pressure, liquid fertilizer levels, or the like.

In the illustrated embodiment, each gauge 58 includes an indicator 68 configured to show an operating mode. For instance, as described in detail below, the operating mode may be idle. However, in other embodiments, the operating mode may be an automatic operating mode or a manual operating mode. In the illustrated embodiment, the indicator 68 includes a line 70 extending across the gauge 58 to mark or delineate a current position of a valve, for example. As will be discussed in detail below, the line 70 may assist operators when manually setting desired set points of valves.

As shown, the indicator 68 includes a circle surrounding the line 70. However, other shapes may also be used. For instance, the indicator 68 may include a square, triangle, rectangle, octagon, or any other shape. Moreover, as will be discussed below, different shapes may be used to indicate different operating modes (e.g., idle, automatic, manual, etc.). Furthermore, the shape of the indicator 68 may also be paired with a color (e.g., red, blue, etc.) to provide an additional indication to the operator regarding the operating mode. Additionally, in certain embodiments, the indicator may be hollow (e.g., colored along the perimeter) in certain operating modes and filled (e.g., colored surface area) in other operating modes.

Moreover, in the illustrated embodiment, each gauge 58 has an associated numerical display 72. The numerical display 72 is configured to display in real-time or near real-time (e.g., based on sensor measurements from within the system 40) the actual/measured state of operation (e.g., valve position) to the operator. The user interface 48 of the illustrated embodiment includes five numerical displays 72 corresponding to the number of gauges 58. As shown, the numerical displays 72 each display 0.0 percent and the indicators 68 are at a zero point on each gauge 58 because the control system 40 is in the idle mode. However, as will be discussed below, the numerical display 72 changes as the state of operation of the electro-hydraulic remote valve 54 change. Furthermore, as mentioned above, the color of the numerical display 72 may change, e.g., corresponding to the color of the indicator 68. For example, if the indicator 68 switches from blue to red as the valve goes into a manual operation mode, the numerical display 72 also switches to red and displays the measured state of operation in red. As a result, the operator may quickly see the current state of operation and know which operating mode is controlling the agricultural implement 10 and/or the work vehicle 12. It should be appreciated that while, in the illustrated embodiment, a switch from blue to red is described, that any color change may be sufficient to represent a change of operating mode.

In the illustrated embodiment, the user interface 48 includes a fifth gauge 74 in a vertical orientation. Moreover, the fifth gauge 74 includes a range from 0 to 100, indicating an up or down position of a three point hitch. As mentioned above, the fifth gauge 74 also includes the indicator 68 and the line 70 to illustrate the position of the three point hitch. As will be appreciated, the numerical display 72 of the fifth gauge 74 corresponds to the color of the indicator 68 in embodiments in which the color of the indicator 68 and the color of the number presented on the numerical display 72 changes based on the operating mode of the controller 42.

As will be discussed in detail below, operators may change the operating parameters of the agricultural implement 10 and/or the work vehicle 12 using the gauges 58. For example, the agricultural implement 10 and/or the work vehicle 12 may be operating in an automatic mode by default. As a result, the operating parameters displayed in the numerical display 72 automatically vary according to changes made by the controller 42 (e.g., based on instructions stored on the memory 44). However, the operator may override those settings and switch to a manual operating mode through interaction with the gauges 58. For instance, the operator may depress the indicator 68 of the desired gauge 58 and move (e.g., slide, reposition, etc.) the indicator 68 to a desired location along the gauge 58. As a result, the operating mode switches from automatic to manual. In other embodiments, the user interface 48 may include a button that enables switching between the automatic mode 76 and the manual mode 78.

Figure 4:
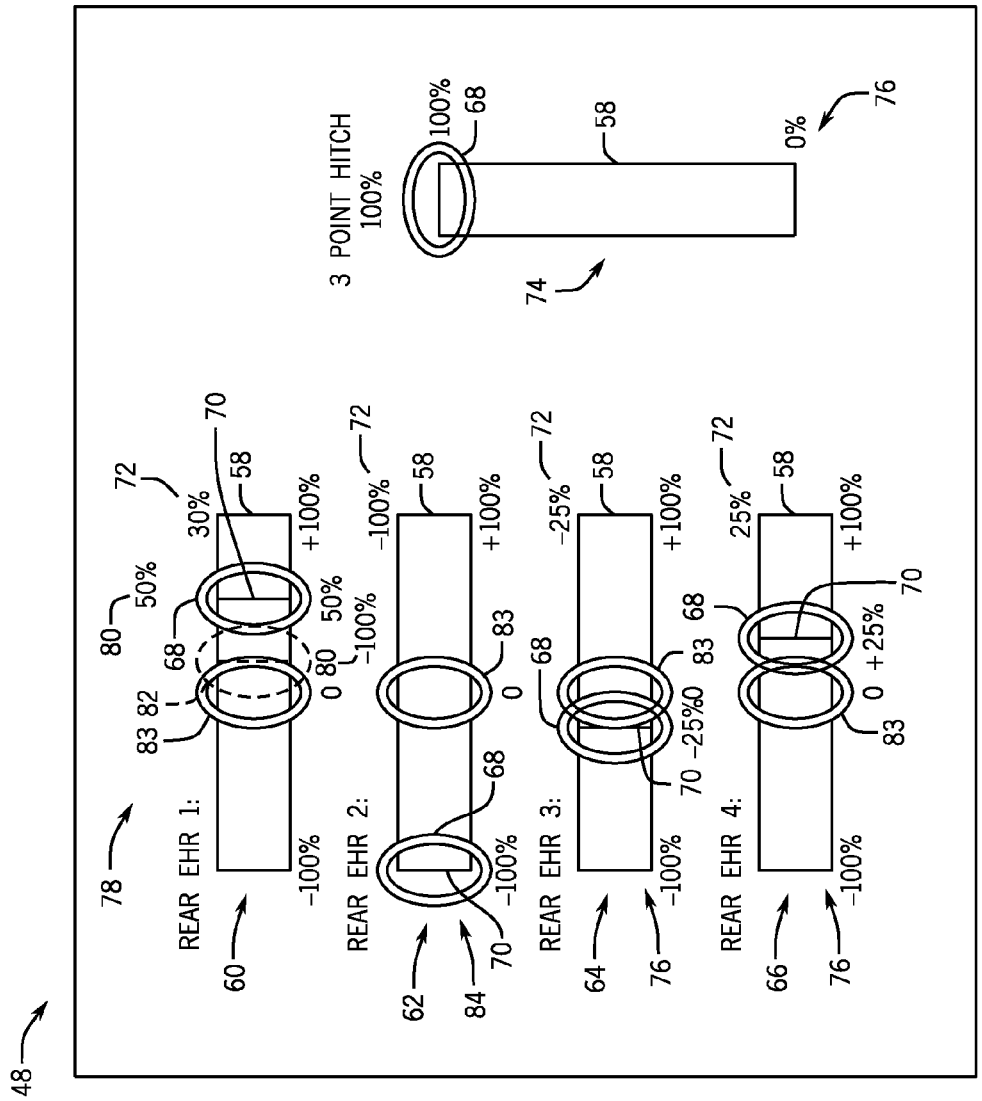
FIG. 4 is a schematic drawing of the user interface of FIG. 3, in which the control system is in an operation mode.

FIG. 4 is a schematic drawing of the user interface 48 in which the gauges 58 are displaying different operating modes. Turning to the first gauge 60, the operation of the Rear EHR 1 is switched from an automatic mode 76 (e.g., controller 42 controlled) to a manual mode 78 (e.g., operator controlled). As mentioned above, the automatic mode 76 may be the default operating mode. While operating in the automatic mode 76, the controller 42 determines the state of operation of the valves (e.g., the respective positions). For instance, the controller 42 may determine the state of operation based on information stored on the memory 44. As a result, the controller 42 sends signals to the pump 50 and/or to the electro-hydraulic remote valve 54 to control operation of the agricultural implement 10 and/or the work vehicle 12. However, in the manual mode 78, the operator may override the state of operation established by the automatic mode 76. For instance, the operator may change the state of operation based on anticipated field conditions (e.g., approaching hills, lower yield areas, etc.).

As shown, a manual setting display 80 is presented beside the numerical display 72 of the first gauge 60. The manual setting display 80 indicates the set point of the first gauge 60, as established by the operator in the manual mode 78. That is, the manual setting display 80 becomes visible when the operator activates the manual mode 78. Moreover, the manual setting display 80 may be the same color as the indicator 68 in embodiments in which the indicator 68 changes colors based on the operating mode. In certain embodiments, the manual setting display 80 may be visible when the numerical display 72 does not match the manual setting display 80 (e.g., while the valve is transitioning to the operation point set by the manual mode 78). Moreover, the manual setting display 80 may not be visible after the valve reaches the position designated by the manual setting display 80. The operator activates the manual mode 78 by depressing or contacting the indicator 68 and moving it to a new position, as described above. Thereafter, the operator holds the indicator 68 for a predetermined amount of time (e.g., 1 second, 2 seconds, etc.) to lock or set the indicator 68 at the desired position, thereby adjusting the state of operation. In some embodiments, haptic feedback indicates that the manual mode 78 is engaged. However, in alternative embodiments, the operator may not hold the indicator 68 for a predetermined amount of time to change the state of operation. Instead, the indicator 68 may freely slide to different positions along the gauge and change the state of operation once the operator ceases to depress the indicator 68.

In the illustrated embodiment, the manual setting display 80 is set to +50 percent. That is, the line 70 is aligned with the +50 percent notation on the first gauge 60. However, as shown, the numerical display 72 indicates that the electro-hydraulic remote valve 54 is at +30 percent. Accordingly, the operator may monitor the current setting on the numerical display 72 and compare it to the desired manual setting display 80 to watch the valve approach the desired position. Furthermore, as shown in the illustrated embodiment, a current position indicator 82 moves along the first gauge 60 toward the indicator 68 at the desired set point. The current position indicator 82 provides another indication for the operator to monitor the valve position approaching the desired value. That is, the current position indicator 82 represents the measured/actual state of operation. In some embodiments, the current position indicator 82 may be a different color or shape than the indicator 68. For example, the indicator 68 may be red to indicate that the operator has switched to the manual mode 78. As a result, the manual setting display 80 is also red. However, the current position indicator 82 may be grey to provide a contrasting indication of the current position (e.g., measured/actual state of operation) of the valve. In some embodiments, the numerical display 72 may be the same color as the current position indicator 82 to indicate to the operator that the numerical display 72 represents the current valve position (e.g., the operational state of the valve). In an alternative embodiment, the first gauge 60 may change colors to indicate that a change is being made based on the switch from the automatic mode 76 to the manual mode 78. For example, a portion of the gauge 58 from 0 to +50 percent may change color as the position of the valve approaches the value of the manual setting display 80.

Furthermore, as shown in the illustrated embodiment, the first gauge 60 includes an idle position indicator 83. For example, the idle position indicator 83 is a different color than the indicator 68 and remains at the idle position of the valve (e.g., at the 0 percent position). The idle position indicator 83 enables the operator to compare the current state of operation to the idle position of the valve. Moreover, in certain embodiments, the idle position indicator 83 may be represented by a line having a thickness greater than the line 70. Furthermore, the idle position indicator 83 may be a lighter shade (e.g., less bright) than the indicator 68. As a result, the operator may quickly identify the current state of the valve and compare the current state of the valve to the idle position.

Turning to the second gauge 62, the illustrated embodiment includes the indicator 68 at the −100 percent position (e.g., full flow out of the valve of the electro-hydraulic remote valve 54 to the tank 52, flow out of a port of a multi-port valve, etc.). In the illustrated embodiment, the second gauge 62 is in a swing mode 84. In the swing mode 84, the operator may set the electro-hydraulic remote valve 54 to quickly open or close a valve. For instance, the swing mode 84 is configured to set the valve to a certain position and then to have the valve return to the previous position. For example, the operator may depress the indicator 68, move the indicator 68 to the desired position, and then release the indicator 68 before the time period indicated above to switch to the manual mode 78. As a result, the electro-hydraulic remote valve 54 operates the valve at the set position for a period of time and then returns the valve to the previous position. As described above, the indicator 68, the manual setting display 80, and/or the numerical display 72 may change colors or shapes (e.g., shape of the indicator 68, font of the numerical display 72) to indicate that the second gauge 62 is operating in the swing mode 84. Moreover, in certain embodiments, the swing mode 84 may be configured to return the valve to the idle state after the swing is complete.

In the illustrated embodiment, the third gauge 64 is operating in the automatic mode 76. As a result, no manual setting display 80 is presented. Moreover, the color and/or shape of the indicator 68 in the third gauge 64 matches the color of the numerical display 72 which corresponds to the color and/or shape of the automatic mode 76. Similarly, the fourth gauge 66 is also in the automatic mode 76. Turning to the fifth gauge 74, the illustrated embodiment includes the three-point hitch at 100 percent (e.g., raised). As a result, the indicator 68 is at the 100 percent position. Moreover, the three-point hitch is controlled in the automatic mode 76. Accordingly, the indicator 68 may be the same color as the numerical display 72.

Figure 5:
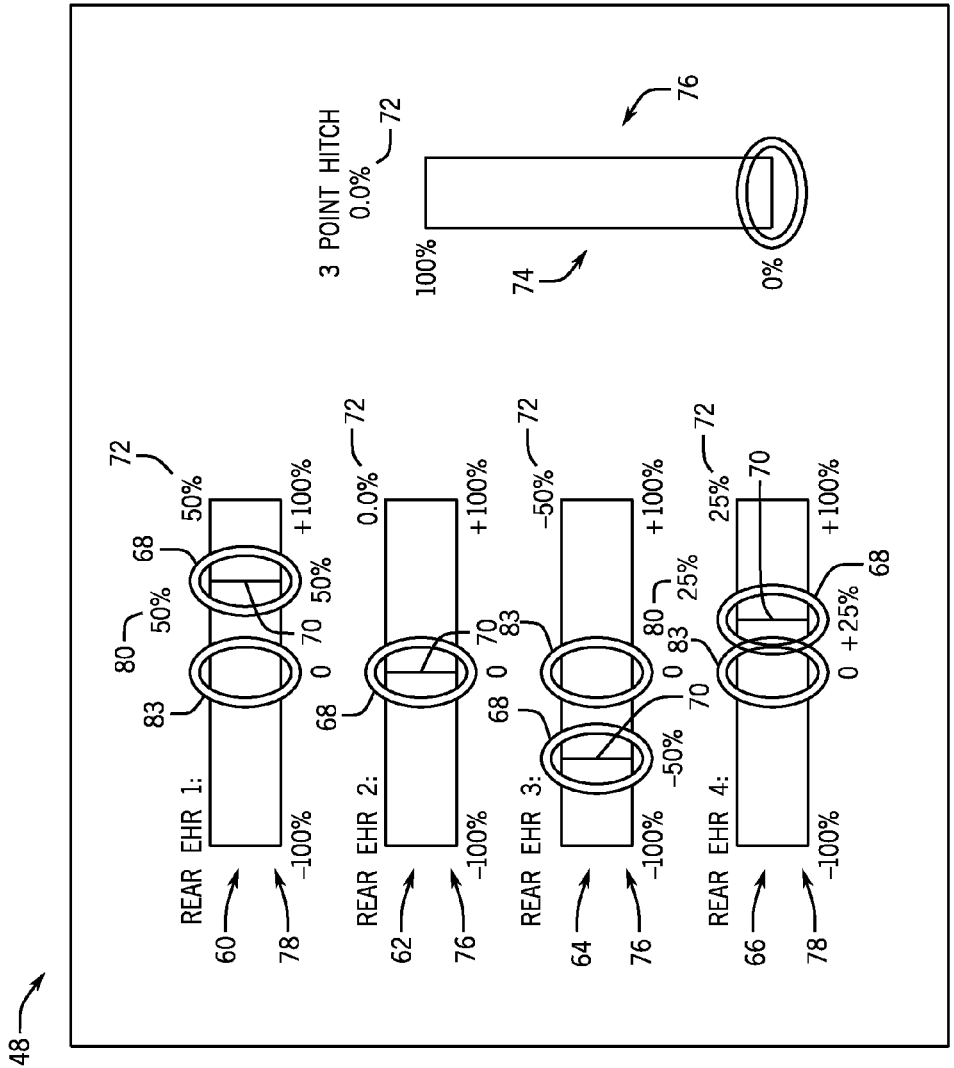
FIG. 5 is a schematic drawing of the user interface of FIG. 3, in which the control system is in an operation mode in which gauges are operating in an automatic mode and in a manual mode.

FIG. 5 is a schematic drawing of the user interface 48 in which the gauges 58 are displaying different operating modes. In the illustrated embodiment, the first gauge 60 has reached the manual set point of +50 percent established by the operator as described above with respect to FIG. 4. As a result, the value presented by the numerical display 72 matches the value presented by the manual setting display 80. Moreover, the color of the indicator 68 matches the color of the manual setting display 80 as described above. In some embodiments, the numerical display 72 may match the color of the manual setting display 80 as the numerical display 72 reaches the value established by the manual setting display 80. Moreover, the current position indicator 82 is no longer visible because the indicators would overlap. As shown, the first gauge 60 continues to operate in the manual mode 78 until acted on by the operator. For example, the operator may double-click on the indicator 68 to switch from the manual mode 78 back to the automatic mode 76.

In the illustrated embodiment, the second gauge 62 is in the automatic mode 76 after returning from the swing mode 84. For example, the swing mode 84 is configured to perform a command for a period of time and return to the automatic mode 76 and/or to the manual mode 78 after the time has elapsed. Moreover, in certain embodiments, the valve may be configured to return to the idle state. As shown, the automatic mode 76 has the indicator 68 at the 0 percent point (e.g., non-operational). As a result, the manual setting display 80 is not visible. Furthermore, the indicator 68 is a color and/or a shape indicative of the automatic mode 76. However, in some embodiments, the indicator 68 is the color indicative of the non-operational mode.

Turning to the third gauge 64, the indicator 68 is at the −50 percent position. In some embodiments, the automatic mode 78 may automatically change the state of operation based on upcoming field conditions. Accordingly, as shown, the indicator 68 and the numerical display 72 are the same color and there is no manual setting display 80 visible.

However, in other embodiments, a display for the automatic setting may be included. Furthermore, the automatic mode 76 may be overridden by the manual mode 78. For example, the indicator 68 of the fourth gauge 66 is at the +25% position and in the valve is in the manual mode 78. That is, the automatic mode 76 is overridden by the operator activating the manual mode 78. As a result, the color of the indicator 68 and the numerical display 72 correspond to the color indicative of the manual mode 78. Additionally, the manual setting display 80 is visible. Furthermore, the fifth gauge 74 is in the 0 percent position from the previously shown 100 percent position. As mentioned above, the change in the state of operation may have been ordered by the operator in the manual mode 78 or by the controller 42 in the automatic mode 76.

As described above, in certain embodiments, the electro-hydraulic remote valves 54 may include multi-port valves. For example, a first port and a second port may be fluidly coupled to the hydraulic actuator 56, the tank 52, and the pump 50. Accordingly, the electro-hydraulic remote valves 54 may operate in several states. For example, in an idle or neutral state, the first and second ports may be blocked with respect to the hydraulic actuator 56, the tank 52, and the pump 50. However, in an extend state the first port may be fluidly coupled to the pump 50 while the second port is fluidly coupled to the tank 52. Furthermore, in a retract state the second port may be fluidly coupled to the pump 50 while the first port is fluidly coupled to the tank 52. Moreover, in a float state the first and second ports may be fluidly coupled to the tank 52 and blocked with respect to the pump 50. Accordingly, the gauges 58 may correspond to the different states of the multi-port valves. For example, the "−100%" position may correspond retract state while the "+100%" position may correspond to the extend state. In certain embodiments, double-clicking on the indicator 68 may activate the float state. Moreover, sliding the indicator 68 past the +100% point on the gauge 58 may activate the float state. It should be appreciated that the float state may be activated via a variety of interactions with the gauge 58. Furthermore, the indicator 68 may change color and/or shape to represent the float state. However, in certain embodiments, an icon may appear proximate to the gauge 58 to indicate the gauge 58 is in the float state. Furthermore, the numerical display 72 may display "FLOAT" to indicate the position of the electro-hydraulic remote valve 54.

Figure 6:
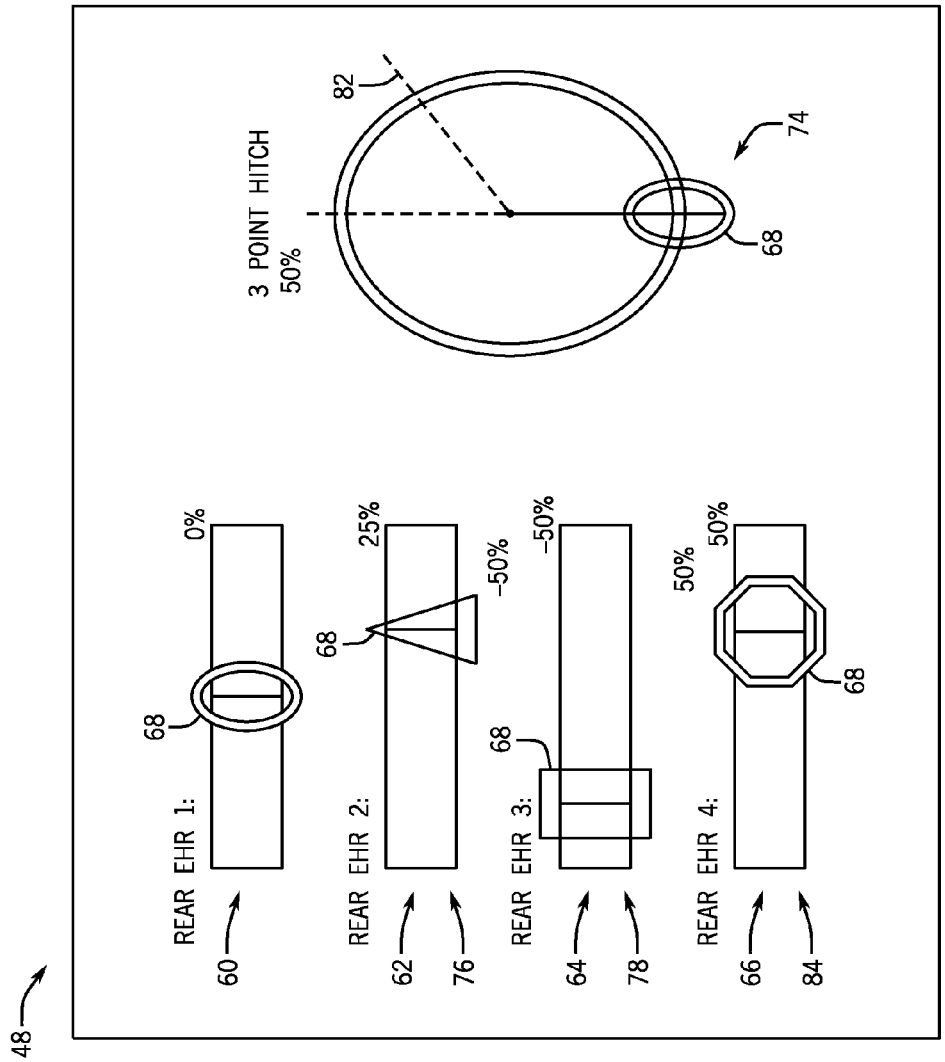
FIG. 6 is a schematic drawing of an alternative embodiment of a user interface configured to monitor and/or control the control system of FIG. 2.

FIG. 6 is a schematic drawing of an alternative embodiment of the user interface 48 configured to monitor and/or control the control system 42. As described above, different settings (e.g., the automatic mode 76, the manual mode 78, etc.) may correspond to different shapes of the indicators 68. For instance, in the depicted embodiment, the first gauge 60 is included in the non-operational mode. As a result, the indicator 68 is a circle. However, the second gauge 62 is included in the automatic mode 76. Accordingly, the indicator 68 is a triangle. Furthermore, the third gauge 64 is in the manual mode 78, and the indicator 68 is a rectangle. Moreover, the fourth gauge 66 is in the swing mode 84, and the indicator is an octagon. As described above, the indicators 68 may correspond in color to the numerical display 72, manual setting display 80, and/or the current position indicator 82. By incorporating additional shape changes to the gauges 58, the operator may quickly and easily identify the operating mode of the valve associated with each gauge 58. Moreover, other shapes may be included in alternative embodiments.

Furthermore, in the illustrated embodiment, the fifth gauge 74 is a circular, dial-shaped gauge. However, in some embodiments, the gauge 58 may include a space or separation between the 100 percent position and the 0 percent position. The fifth gauge 74 still contains a line 70 to indicate the set point of the fifth gauge 74. In some embodiments, the indicator 68 is also included. However, in alternative embodiments, a portion of the fifth gauge 74 may change in color to indicate the set point of the fifth gauge 74. Moreover, as described above, the fifth gauge 74 includes a current position indicator 82 to provide an indication to the operator as to the current state of operation of the valve. As will be appreciated, the gauges 58 may be other shapes, such as squares, arcs, and the like. For instance, the fifth gauge 74 may be an arc with a separation between the 100 percent position and the 0 percent position.

Figure 7:
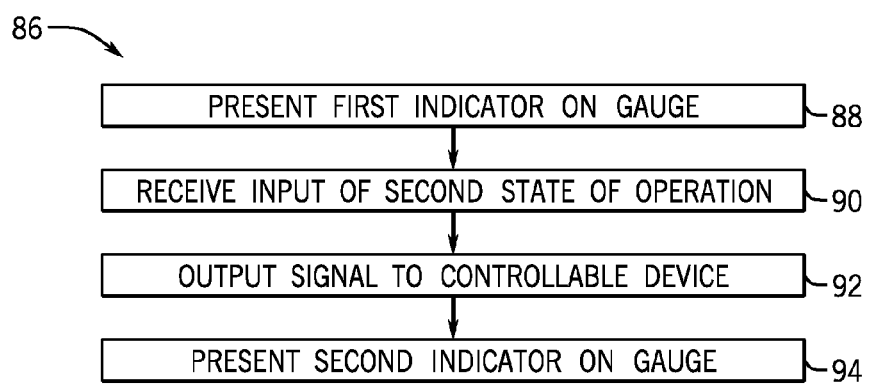
FIG. 7 is a flow chart of an embodiment of a method of operating the control system.

FIG. 7 is a flow chart of an embodiment of a method 86 for operating the control system 40. The controller 42 presents a first indicator 68 on the gauge 58 on the display of the user interface 48 at block 88. For instance, the first indicator 68 may be indicative of a first state of operation of the electro-hydraulic remote valve 54. The controller 42 receives an input indicative of a second state of operation at block 90. For example, the controller 42 may be operating in the automatic mode 78 and the processor 46 may send instructions to the controller 42 to adjust the state of operation of the electro-hydraulic remote valve 54. In other embodiments, the operator may switch to the manual mode 78 by interacting with the gauge 58 to adjust the state of operation. The controller 42 outputs a signal to the electro-hydraulic remote valve 54 indicative of the second state of operation at block 92. As a result, the electro-hydraulic remote valve 54 adjusts the state of operation of the valve. For example, the controller 42 may be operating in the automatic mode 78 and send instructions to the electro-hydraulic remote valve 54 to adjust the open/close ratio of the valve. At block 94, the controller presents a second indicator 68 on the gauge 58 indicative of the second state of operation of the electro-hydraulic remote valve 54. That is, the numerical display 72 may display a value indicative of the position of the valve.

As described in detail above, the disclosed embodiments include the user interface 48 for adjusting and monitoring the controller 42. For instance, the user interface 48 is configured to enable the operator to monitor the operating mode of the agricultural implement 10 and/or the work vehicle 12. As a result, the operator may switch between the automatic mode 76 (e.g., controller 42 controlled) and the manual mode 78 (e.g., operator controlled) with the user interface 48. Moreover, the operator may monitor changes quickly and efficiently via the user interface 48 due to changes to the indicator 68 and numerical display 72. For example, the indicator 68 may change color and/or shape to indicate that use of the automatic mode 76 or the manual mode 78. Furthermore, in some embodiments, the numerical display 72 may change color to match the indicator 68. As a result, the operator may quickly and efficiently identify the operating mode of the agricultural implement 10 and/or the work vehicle 12, make changes are necessary, and continuously monitor the state of operation.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An electronic control system for an agricultural system, comprising:

a controller configured to instruct a display of a user interface to present a gauge having a first indication of a current state of operation of a controllable device of the agricultural system, to receive an input indicative of a target state of operation of the controllable device, to output a signal to the controllable device indicative of the target state of operation, and to instruct the display to present a second indication on the gauge indicative of the target state of operation while the first indication is presented.

2. The electronic control system of claim 1, wherein the controller is configured to instruct the display to present a third indication on the gauge indicative of a default state of operation.

3. The electronic control system of claim 1, wherein the input is configured to be manually input via interaction with the gauge.

4. The electronic control system of claim 3, wherein the controller is configured to receive an input indicative of an operating mode and to instruct the display to present a third indication of the operating mode.

5. The electronic control system of claim 3, wherein the controller is configured to receive the manual input upon interaction with the gauge for a predetermined amount of time.

6. The electronic control system of claim 1, where the controller is configured to instruct the display to present the gauge comprising:
   a slider portion having a first end and a second end bounding the first and second indications; and
   a numerical display configured to display a value indicative of a current state of operation.

7. The electronic control system of claim 6, wherein the controller is configured to instruct the display to present the numerical display in the same color as the first or second indication.

8. The electronic control system of claim 1, wherein the first and second indicators comprise indicators of different colors, shapes, or a combination thereof.

9. An electronic control system for an agricultural system, comprising:
   a controller comprising a memory operatively coupled to a processor configured to store data and instructions that, when executed by the processor, cause the controller to perform a method comprising:
      instructing a display of a user interface to present a first indicator on a gauge indicative of a first state of operation of a controllable device of the agricultural system;
      receiving an input indicative of a second state of operation of the controllable device;
      outputting a signal to the controllable device indicative of the second state of operation, wherein the controllable device is configured to adjust an operating parameter of the agricultural system; and
      instructing the display to present a second indicator on the gauge indicative of the second state of operation of the controllable device while the first indication is presented.

10. The electronic control system of claim 9, wherein the input is configured to be manually input via interaction with the gauge.

11. The electronic control system of claim 10, wherein the method comprises instructing the display to change a color, a shape, or a combination thereof, of the second indicator based on whether the input was received from the automatic control system or from a manual input.

12. The electronic control system of claim 9, wherein the first and second indicators are different colors.

13. The electronic control system of claim 9, wherein the first and second indicators are different shapes.

14. The electronic control system of claim 9, wherein the method comprises instructing the display to present a numerical display adjacent to the gauge, and the numerical display is configured to present a value indicative of the second state of operation.

15. A method of monitoring and controlling an agricultural system, comprising:
   instructing a display of a user interface to present a first indicator on a gauge indicative of a first state of operation of a controllable device of the agricultural system;
   receiving an input indicative of a second state of operation of the controllable device;
   outputting a signal to the controllable device indicative of the second state of operation, wherein the controllable device is configured to adjust an operating parameter of the agricultural system; and
   instructing the display to present a second indicator on the gauge indicative of the second state of operation of the controllable device while the first indicator is presented.

16. The method of claim 15, comprising instructing the display to present a value indicative of the first state of operation of the controllable device on a numerical display proximate to the gauge.

17. The method of claim 15, wherein receiving an input indicative of a second state of operation comprises receiving the input from an interaction with the gauge.

18. The method of claim 15, comprising instructing the display to change a color of the second indicator in response to selection of an operating mode while presenting the second indicator on the gauge.

19. The method of claim 18, comprising instructing the display to change a shape of the second indicator in response to selection of an operating mode while presenting the second indicator on the gauge.

20. The method of claim 15, comprising instructing the display to present a third indicator on the gauge to represent adjustments of the controllable device as the controllable device transitions between the first state of operation and the second state of operation.

* * * * *